United States Patent [19]

Ternes et al.

[11] Patent Number: 4,540,501

[45] Date of Patent: Sep. 10, 1985

[54] GAS HYDRATE COOL STORAGE SYSTEM

[75] Inventors: Mark P. Ternes, Knoxville; Robert J. Kedl, Oak Ridge, both of Tenn.

[73] Assignee: The United States of America as represented by the United States Department of Energy, Washington, D.C.

[21] Appl. No.: 649,628

[22] Filed: Sep. 12, 1984

[51] Int. Cl.³ .......................... C09K 3/18; F25B 15/00
[52] U.S. Cl. ............................................ 252/70; 62/1; 62/59; 62/112; 62/114; 165/1; 165/104.21; 165/DIG. 4; 252/69
[58] Field of Search ................... 252/69, 70; 62/1, 59, 62/112, 114; 165/1, 104.21, DIG. 4

[56] References Cited

U.S. PATENT DOCUMENTS

| | | | |
|---|---|---|---|
| 3,247,678 | 4/1966 | Mohlman | 62/185 |
| 3,353,366 | 11/1967 | Orfeo et al. | 62/112 |
| 3,976,584 | 8/1976 | Leifer | 252/70 |
| 4,207,351 | 6/1980 | Davies | 62/534 |
| 4,472,294 | 9/1984 | Hisamoto et al. | 252/DIG. 1 |

FOREIGN PATENT DOCUMENTS 54-102297  8/1979  Japan .

OTHER PUBLICATIONS

Saito, "Gas Hydrates," Nippon Kaisui Gakkai-Shi 1968, 22(2), 209–11, (CA 69: 23682h).
Krasnov, "Thermodynamics of Inclusion Compounds, I. Monothermal Heat Machine," Zh. Fiz. Khim. 1978, 52(8), 2137, (CA 90: 57909r).
Makita et al., "Fundamental Studies on Water Desalination by Fluorocarbon Gas Hydrate Formation," Kenkyu Hokoku-Asahi Garasu Kogyo Gijutsu Shoreikai 1983, 42, 271–6, (CA 100: 126644q).

Primary Examiner—Paul Lieberman
Assistant Examiner—Robert A. Wax
Attorney, Agent, or Firm—Katherine P. Lovingood; Stephen D. Hamel; Judson R. Hightower

[57] ABSTRACT

This invention is a process for formation of a gas hydrate to be used as a cool storage medium using a refrigerant in water. Mixing of the immiscible refrigerant and water is effected by addition of a surfactant and agitation. The difficult problem of subcooling during the process is overcome by using the surfactant and agitation and performance of the process significantly improves and approaches ideal.

9 Claims, 5 Drawing Figures

GAS HYDRATE COOL STORAGE SYSTEM

This invention relates to the development of a process utilizing a gas hydrate as a cool storage medium for alleviating electric load demands during peak usage periods and was developed as a result of a contract with the United States Department of Energy.

BACKGROUND OF THE INVENTION

The use of air conditioning for cooling during warmer months has increased steadily in recent years. As a result, many utilities have experienced large power demands in the summer which impose a severe burden on their generating capacity. These peak loads require expensive peaking generators to meet the peak loads and require the utilities to maintain expensive generating capacity that is under-utilized during periods of lesser demand. Consequently, it is necessary to develop a means for shifting electricity consumption from peak demand periods to off-peak periods. One solution is the development of a heat pump thermal energy storage (TES) system that has the capability of removing heat from a storage material during off-peak periods and using the cooled storage material as a heat sink during peak demand periods.

Methods of incorporation of cool storage in heat pump and air conditioning systems have been developed, the most common being the use of water or ice as the storage medium. However, both have their disadvantages. Large volumetric storage capacities are required for cool storage systems which utilize the sensible heat capacity of water. In addition, water storage systems must typically operate over a large temperature range to be effective. In ice storage systems, the low temperatures that are required to freeze ice and the heat exchange penalty resulting from ice buildup on the heat exchanger coils reduce air conditioner performance and increase operating costs. In addition to water and ice, use of hydrated salts as a storage medium has also been investigated. Studies have also been performed to develop aqueous organic hydrates for use as a cool storage medium.

A continuing search for a better cool storage medium has led to the consideration of clathrates. Clathrates are distinguisned by having molecules of one type completely enclosed within the crystalline structure of molecules of another type. Thermal energy storage materials have been developed using clathrate-forming compounds dissolved in water. Gas hydrates are a subset of the class of the solid compounds called clathrates. For gas hydrates, a guest molecule is contained within a cage-like crystalline structure of the host water molecules (see FIG. 1). The guest molecules 1 stabilize the crystalline structure of the host by occupying the cavities formed within the crystalline water structure 3. For many guest molecules, this stabilization of the crystalline lattice has the effect of causing water to freeze at a temperature higher than is required under ordinary circumstances with only water molecules present. This is an advantage since the freezing point of water, 32° F., is lower than that required for air conditioning purposes and causes a decrease in air conditioner performance.

Another advantage is that many common refrigerants, such as R-12 ($CCl_2F_2$), form gas hydrates under appropriate conditions. Since the guest molecule of the gas hydrate can be the same as the refrigerant, the possibility exists to incorporate the cool storage medium directly into the heat pump cycle, thus allowing the use of direct contact heat exchange to charge the system and eliminating the need for an additional heat exchanger. This advantage will be further explained in the description of the invention. For these and other reasons gas hydrates offer advantages over water, ice, hydrated salts, organic hydrates and other clathrates as a cool storage medium.

Investigations using refrigerants as the guest component of a gas hydrate cool storage medium have been pursued both at Oak Ridge National Laboratory and Argonne National Laboratory. Continuing problems arose due to the immiscibility of refrigerants in water causing difficulty in both initial nucleation and completed reaction. Tests show that performance of the process of crystallization during gas hydrate formation varied considerably from ideal and prevented realization of the anticipated advantages of a gas hydrate system. It was believed this was due to the difficulties arising when the gases and liquids of the guest and host molecules did not mix in the melted noncrystalline state. This invention addresses this mixing problem and is a process for formation of a gas hydrate as a storage medium to be incorporated into a heat pump and air conditioning system.

SUMMARY OF THE INVENTION

In view of the above, it is an object of this invention to develop an improved heat pump/thermal energy storage (TES) system.

It is another object of this invention to develop a process for formation of a gas hydrate to be used as storage material in a TES system.

It is another object of this invention to develop a process for formation of a gas hydrate that can be incorporated in a TES system within a heat pump cycle system.

It is another object of this invention to develop a direct contact heat transfer process for formation of a cool storage medium in a TES system.

It is another object of this invention to develop a gas hydrate formation process that provides a storage temperature in a range compatible with standard HVAC (heating, ventilating, and air conditioning) practice in a TES system.

It is another object of this invention to develop a gas hydrate formation process that minimizes the size of the containment vessel required for the cool storage medium in a TES system.

It is another object of this invention to present a gas hydrate formation process that eliminates the need for an internal heat exchanger to form the cool storage medium in a TES system.

It is another object of this invention to present a gas hydrate formation process that enables the cool storage unit to be charged and discharged at a constant temperature in a TES system.

It is another object of this invention to provide a composition of matter to be used as a cool storage medium.

It is another object of this invention to provide a composition of matter to be used as a cool storage medium that freezes at a temperature that is compatible with standard HVAC practice in a TES system.

Additional objects, advantages and novel features of the invention will be set forth, in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, this invention is a process for the formation of a gas hydrate to be used in a thermal energy storage system. The guest component is placed in a container with water and a small amount of surfactant to promote mixing of the water and guest component to obtain increased surface contact. A vapor space mainly composed of the guest component in its gaseous state should exist above the liquid level. The mixture is stirred or agitated and the resulting emulsion yields the high surface contact area that is required between the water and guest component. Cooling the resulting mixture by any technique such as heat exchanger tubes, direct contact, or any other technique, will result in the formation of gas hydrate at a temperature which is determined by the pressure on the system.

The cool storage unit can be incorporated directly into the heat pump cycle, where the guest component serves as the heat pump refrigerant. Thus, the cool storage unit is an integral part of the heat pump cycle, serving as the evaporator as well as the cool storage tank. Heat is removed from the storage tank through the operation of the refrigeration system. The compressor removes refrigerant vapor from the top of the storage tank as the same weight of mixed liquid and vapor refrigerant is pumped into the storage tank through an expansion device. The pressure and temperature within the storage tank fall as a result of this operation until the temperature and pressure for gas hydrate formation is reached. The process consists of a direct contact heat exchange mechanism having the cool storage medium form directly in the storage tank/evaporator without the need for an additional heat exchanger.

Also, to achieve the foregoing objects, this invention is a composition of matter. The composition of matter consists essentially of water, a refrigerant, and a small amount of a surfactant sufficient to enhance the mixing of the water and refrigerant.

The refrigerant is selected from the group of brominated, chlorinated or fluorinated hydrocarbons, including $CCl_2F_2$, $CCl_3F$, $CBrF_3$, $CHCl_2F$, $CHClF_2$, $CH_2ClF$, and $CH_3CClF_2$ and the ratio of components is one refrigerant molecule to 14–19 water molecules. The surfactant in the context of this invention can be generally described as a nonionic fluorosurfactant having the chemical formula $F(CF_2CF_2)_{3-8}CH_2CH_2O(CH_2CH_2O)_{9-11}H$.

DETAILED DESCRIPTION OF THE PREFERRED EMBODIMENT OF THE INVENTION

Figure 1:
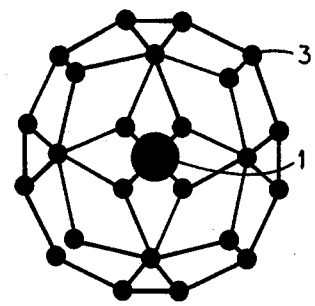
FIG. 1 is a conceptual drawing of a gas hydrate structure.
Figure 2:
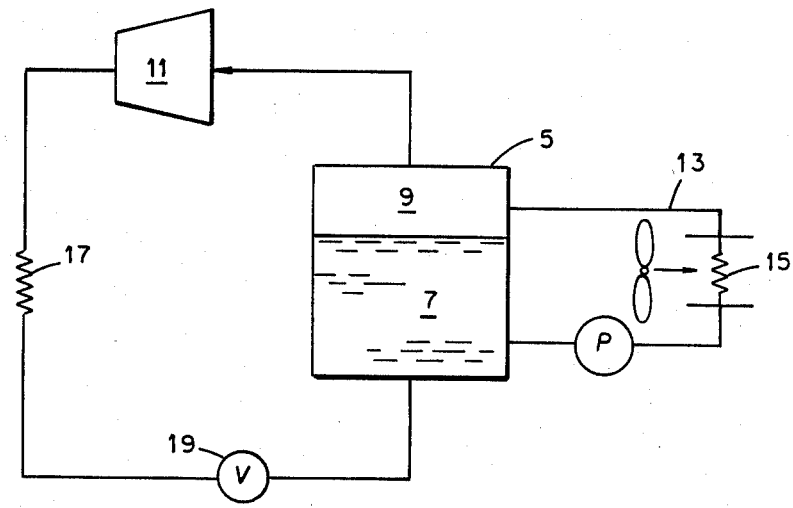
FIG. 2 is a schematic drawing of a heat pump/air conditioning system incorporating gas hydrate formation in the evaporator.

This invention is a process for formation of a gas hydrate to be used in a thermal energy storage (TES) system (see FIG. 2). This TES system consists of a vapor-compression heat pump cycle composed of a compressor 11, a condensor 17, an expansion valve 19, and an evaporator with the conventional evaporator replaced by a storage tank or crystallizer 5 in which the gas hydrate is formed and stored, see FIG. 2. This crystallizer also functions as an evaporator. Before formation of the gas hydrate begins the crystallizer 5 contains refrigerant liquid and water liquid 7 and refrigerant gas 9. The refrigerant serves as the guest component of the gas hydrate as well as the refrigerant of the heat pump cycle. At the initiation of the process of formation, or charging, the compressor 11 lowers the pressure in the crystallizer 5 causing refrigerant liquid to vaporize which is required to maintain an equilibrium. Heat is removed from the crystallizer 5 and the temperature drops accordingly until the temperature for formation of the gas hydrate is reached. The heat released upon formation of the gas hydrate vaporizes refrigerant liquid. When the rate at which refrigerant gas is produced is sufficient to maintain a constant pressure in the crystallizer 5 an equilibrium is reached. Gas hydrate continues to form until all the water or refrigerant liquid is consumed and the charging process is complete. When charging is complete the crystallizer contains the gas hydrate and refrigerant gas 9 and either refrigerant liquid or water, whichever was initially in excess. A secondary recirculating loop 13 linking the storage tank 5 to the conditioned space would be used to transfer heat to the storage system. Refrigerant liquid and/or water would be circulated through a heat exchanger coil 15 located in the building supply duct, and the refrigerant and/or water would be returned to the storage tank 5 in the vapor or liquid state. To complete the cycle, the "cool" solid hydrate would be used to condense the refrigerant gas or reduce the water temperature, melting some of the hydrate in the process. A small amount of refrigerant liquid or water should remain in the storage tank 5 after charging so that this discharge process can be initiated.

Generally, refrigerants are only slightly soluble in water. When placed in a container together, the liquid refrigerant and the water will separate into two layers. The storage tank is not filled, and primarily refrigerant vapor occupies the space above the liquid layers. The little gas hydrate formation that occurs is concentrated at the interfaces, either between the two liquid layers or between the upper liquid layer and the vapor layer. Under these conditions, performance deviates considerably from ideal, see FIG. 3 (Curve 51).

The preferred embodiment of this invention adds to these above-mentioned processes a small amount of surfactant and introduction of agitation to these contents. This promotes mixing and provides the components a large amount of contactual surface area. With constant flow of refrigerant into the crystallizer from an expansion device and from the crystallizer to the compressor, a steady gas hydrate formation process is established that approaches ideal, although there is some subcooling before formation is begun, see FIG. 3 (Curve 55).

The refrigerant used can vary depending on the temperature of the cool storage medium desired, provided of course, the refrigerant is capable of forming a gas hydrate. Refrigerants capable of forming a gas hydrate include the brominated, chlorinated and fluorinated hydrocarbons, of which $CCl_3F$, $CCl_2F_2$, $CBrF_3$, $CHCl_2F$, $CHClF_2$, $CH_2ClF$, and $CH_3CClF_2$ are examples.

The surfactant used can vary but generally must be capable of forming an emulsion between the refrigerant and water.

EXAMPLE

A process for formation of a gas hydrate was developed and studied under simulated heat pump conditions using $CCl_2F_2$, also referred to as R-12, as a representative gas hydrate former.

By understanding the kinetics of this formation process, effective and efficient charging of the storage vessel can be assured. The rate of hydrate formation and the pressure and temperature paths followed by the constituents in the crystallizer were subjects of this investigation. Agitation, refrigerant mass flow rate, initial crystallizer $H_2O(l)$ and R-12(l) mass concentrations and previous cycling history were the parameters selected for investigation.

Figure 4:
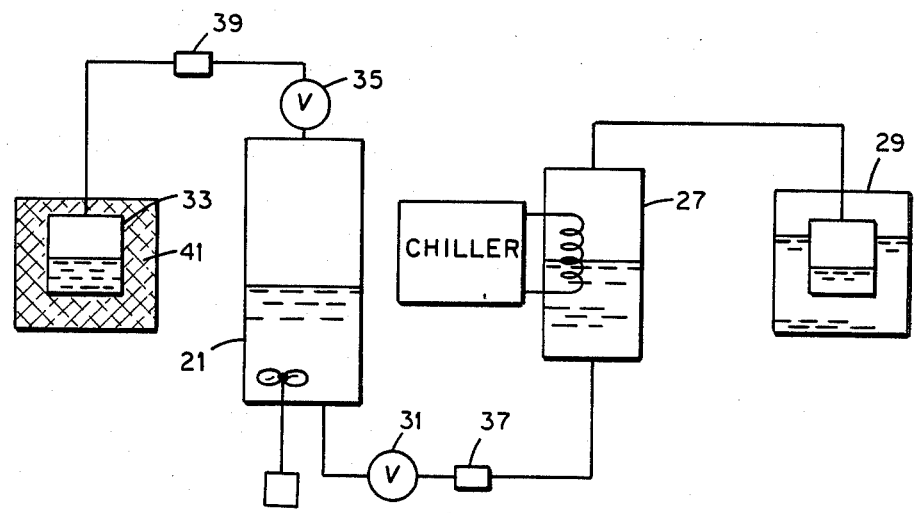
FIG. 4 is a schematic drawing of the experimental process of gas hydrate formation under simulated conditions of a heat pump cycle.

An experimental facility shown in FIG. 4 was designed and built to study these relationships. The facility consisted of a crystallizer 21 in which the hydrate was formed and sufficient instrumentation 37 and 39 to control and measure the inlet and outlet refrigerant mass flow conditions. Room temperature R-12(l) [70°-85° F.(20°-30° C.)] was stored in the condenser 27 and was maintained at a pressure above saturation conditions [6.5-8.0 atm (650-800 kPa)] through the use of an auxiliary R-12 tank placed in a controlled hot water bath 29. Two-phase refrigerant was injected into the crystallizer by throttling the R-12(l) in the condenser 27 across a valve 31. The quality of the refrigerant was not controlled but typically ranged from 5-20% vapor. R-12(g) was allowed to flow out of the crystallizer and condense in a receiver tank 33 which was maintained at a slight vacuum by packing it in dry ice 41; this gas flow rate was adjusted by another valve 35. In the testing performed, the inlet and outlet mass flow rates were always equal to one another and the facility was operated in the described manner to impose simulated heat pump operating conditions on the crystallizer.

Figure 3:
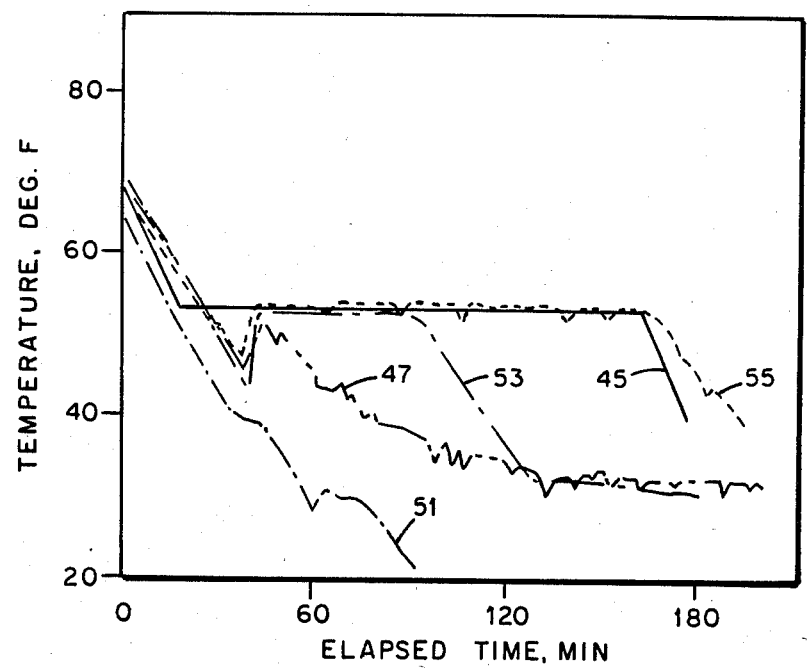
FIG. 3 is a graph showing the performance of the process for gas hydrate formation under various conditions in comparison to ideal performance.
Figure 5:
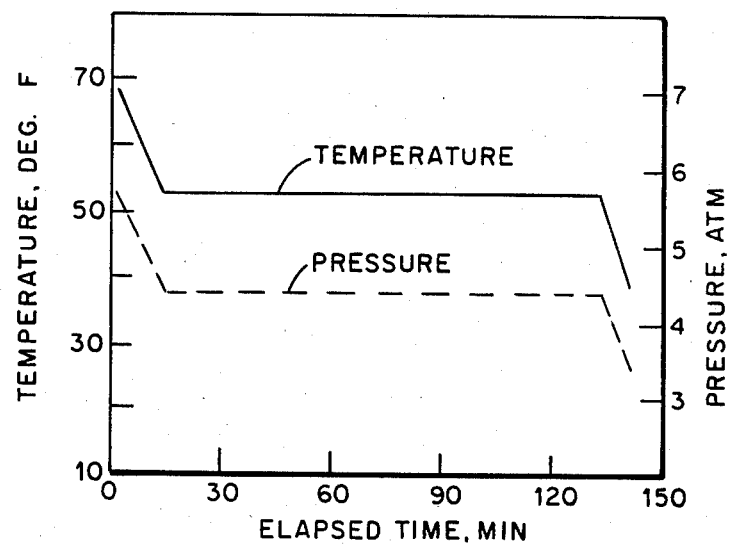
FIG. 5 is a graph showing temperature and pressure responses of the gas hydrate formation process under ideal conditions.

The performance of the crystallizer can be evaluated by comparing measured temperature and pressure responses to those of an ideal crystallizer operating at the same refrigerant flow conditions. FIG. 5 shows ideal temperature and pressure responses. FIG. 3 shows experimental responses assuming a standard refrigerant mass flow rate and including the effects of ambient heat gains and agitation work input. For the ideal case, the temperatures in the crystallizer are uniform throughout, allowing a single temperature measurement to describe the system. As heat is extracted from a crystallizer initially at 70° F. (21° C.), the refrigerant/water mixture is cooled to its critical decomposition temperature of 53° F. (11.7° C.). The system temperature remains constant until all the water in the crystallizer reacts with R-12 to form the gas hydrate, after which any additional heat extraction again sensibly cools the crystallizer contents. The absolute pressure response follows a similar pattern coincident with the temperature response, leveling off to 4.4 atm (440 kPa) which corresponds to the R-12 vapor pressure at 53° F. (11.7° C.).

Fifty-eight tests were performed, and the temperature of the crystallizer fluids at the bottom of the crystallizer for four representative tests is plotted versus time in FIG. 3. The flow rates were identical for each of these tests. The ideal curve 45, which is included on this figure, takes into account heat gains from the ambient and the crystallizer walls, as well as heat gains due to shaft work.

Curves 51 and 47 represent results obtained at the beginning of the investigation with only R-12 and water present in the crystallizer. Curve 51 data were obtained using no agitation, and curve 47 data were obtained for agitation at 1000 RPM. In both cases, it can be seen that the R-12(l)/$H_2O(l)$ mixture subcooled to a temperature below 53° F. (11.7° C.) before nucleation commenced. Following a small time period characterized by increasing temperatures, subcooling of the fluid continued even as hydrate formed for the duration of the test. It was found that neither variations in initial mass concentrations nor frequency of cycling of the crystallizer altered the pressure-temperature response of the process. However, the degree of agitation and the refrigerant mass flow rate did affect the temperature of initial hydrate formation. Greater degrees of agitation and lower mass flow rates tended to decrease the amount of subcooling experienced before nucleation began.

The subcooling occurring after the initiation of nucleation was the result of several problems identified in the hydrate formation process. Since R-12 is virtually insoluble in water, the formation of hydrate occurred predominantly at the R-12/$H_2O(l)$ interfaces where there existed sufficient quantities of R-12 and water in close proximity to one another to react. The formation of crusts at the phase boundaries acted as a physical barrier separating the two components, thus preventing further hydrate formation. Although stirring broke apart these crusts, the stirring action became increasingly ineffective as the solid content of the crystallizer increased. Additionally, the hydrate which formed in these cases did so either in the water, which floated on top of the R-12(l), or above the bulk of the fluids in a froth which formed throughout the tests. Consequently, constant crystallizer temperatures and pressures were never achieved since the heat released during the formation of hydrate went into superheating R-12(g) as opposed to vaporizing R-12(l) as in the ideal case.

Curves 53 and 55 of FIG. 3 depict the results obtained for an agitation and no agitation case after 1 ml of a nonionic fluorosurfactant was added to the R-12(l) and water in the crystallizer. The purpose of adding the surfactant was to obtain an emulsion which effectively dispersed the refrigerant throughout the water to overcome the previously identified limitations. An R-12(l) in water emulsion was obtained which was stable but not dispersed. Physically, two fluid layers still existed when the crystallizer contents were left undisturbed for a period of time consisting of an R-12(l)/$H_2O(l)$ emulsion floating above a pure R-12(l) layer. As shown by curve 53, excellent results were obtained using a surfactant and no agitation until midway in the freezing process. At this time, the formation of hydrate apparently stopped and the crystallizer began to cool dramatically. It is believed that the termination of hydrate formation was due to inadequate mixing of the entering R-12(l) with the remaining water as the solid content of the crystallizer increased. Near ideal performance was obtainable, however, when the surfactant and a sufficient amount of agitation were employed, as can be seen by curve 55. Using agitation and aided by the surfactant, the fluids in the crystallizer remained mixed and hydrate continued to form until all the water had been consumed. Subcooling of the crystallizer contents before the commencement of nucleation was the only observable deviation from ideal. The minimum intensity of agitation and the minimum length of time in which agitation must be supplied to obtain similar results has not been determined. Operation at too low an agitation speed allowed the stirrer to become locked in the thick hydrate slurry.

As in the previous set of experiments, there was no observable effect of initial mass concentrations or cyclic history on the formation process. Using a surfactant with no agitation gave results similar to those already discussed for different flow rates. With agitation and a higher flow rate, a small but noticeable amount of water had not reacted to form hydrate at the end of the test, leading one to surmise that, even with agitation, there is a maximum flow rate above which ideal formation cannot be obtained. When 5 ml of surfactant was used instead of 1 ml, a considerable amount of foam was produced either upon agitation or when hydrate began to form. The presence of this foam is highly undesirable, since it could flow from the crystallizer into the compressor in an actual system.

Subcooling of the crystallizer contents prior to initial nucleation occurred in all tests when the initial temperatures of the crystallizer fluids were above the hydrate formation temperature. Crystal growth occurred immediately in those tests in which a sufficient amount of solid hydrate crystals, formed during a previous test, were still present in the crystallizer.

We claim:

1. A process for formation of a gas hydrate to be used as a cool storage medium comprising:
   partially filling a container with water, a refrigerant capable of forming a gas hydrate and a surfactant;
   agitating said water, refrigerant and surfactant at a rate sufficient to effect mixing thereof;
   lowering the pressure within said container by vapor removal until the temperature and pressure for formation of gas hydrate is reached.

2. The process of claim 1 wherein constant gas hydrate formation is maintained by releasing said refrigerant in the gas phase out of said container, introducing a two-phase liquid/gas mixture of said refrigerant into said container and regulating the flow rate of said refrigerant into and out of said container at a rate sufficient to maintain constant gas hydrate formation.

3. The process of claim 1 wherein said refrigerant is selected from the group of brominated, chlorinated and fluorinated hydrocarbons $CCl_3F$, $CCl_2F_2$, $CBrF_3$, $CHCl_2F$, $CHClF_2$, $CH_2ClF$, and $CH_3CClF_2$ and said surfactant is a nonionic fluorinated surfactant having the chemical formula $F(CF_2CF_2)_{3-8}CH_2CH_2O(CH_2CH_2O)_{9-11}H$.

4. The process of claim 3 wherein said refrigerant and water are present initially in the ratio of approximately one refrigerant molecule to 14–19 water molecules and about 1 ml of surfactant is present for 4,000 ml of total fluid.

5. The process of claim 2 wherein said refrigerant is selected from the group of brominated, chlorinated and fluorinated hydrocarbons including $CCl_3F$, $CCl_2F_2$, $CBrF_3$, $CHCl_2F$, $CHClF_2$, $CH_2ClF$, $CH_3CClF_2$ and said surfactant is a nonionic fluorinated surfactant having the chemical formula $F(CF_2CF_2)_{3-8}CH_2CH_2O(CH_2CH_2O)_{9-11}H$.

6. The process of claim 5 wherein said refrigerant and water are initially present in the ratio of approximately one refrigerant molecule to 14–19 water molecules and about 1 ml of surfactant is present for about 4,000 ml of total fluid.

7. A vapor-compression heat pump system comprising a compressor, a condensor and an expansion device in combination with a crystallizer; said crystallizer comprising:
   a tank;
   a cool storage medium disposed within said tank consisting of refrigerant, water and surfactant;
   means for agitating said cool storage medium;
   means for adjusting the temperature and pressure of said cool storage medium;
   an outlet valve at the top of said tank to release vapor from said tank to said compressor;
   an inlet valve at the base of said crystallizer to admit liquid and vapor from said expansion device; and
   means for transferring heat to and from said cool storage medium.

8. The heat pump system of claim 7 wherein said refrigerant is selected from the group of brominated, chlorinated and fluorinated hydrocarbons $CCl_3F$, $CCl_2F_2$, $CBrF_3$, $CHCl_2F$, $CH_2ClF$ and $CH_3CClF_2$ and said surfactant is a nonionic fluorosurfactant having the chemical formula $F(CF_2CF_2)_{3-8}CH_2CH_2O(CH_2CH_2O)_{9-11}H$.

9. The heat pump system of claim 8 wherein said refrigerant and water are present initially in the ratio of approximately one refrigerant molecule to 14–19 water molecules and about 1 ml of surfactant is present for 4,000 ml of total fluid.

* * * * *